United States Patent Office 3,076,682
Patented Feb. 5, 1963

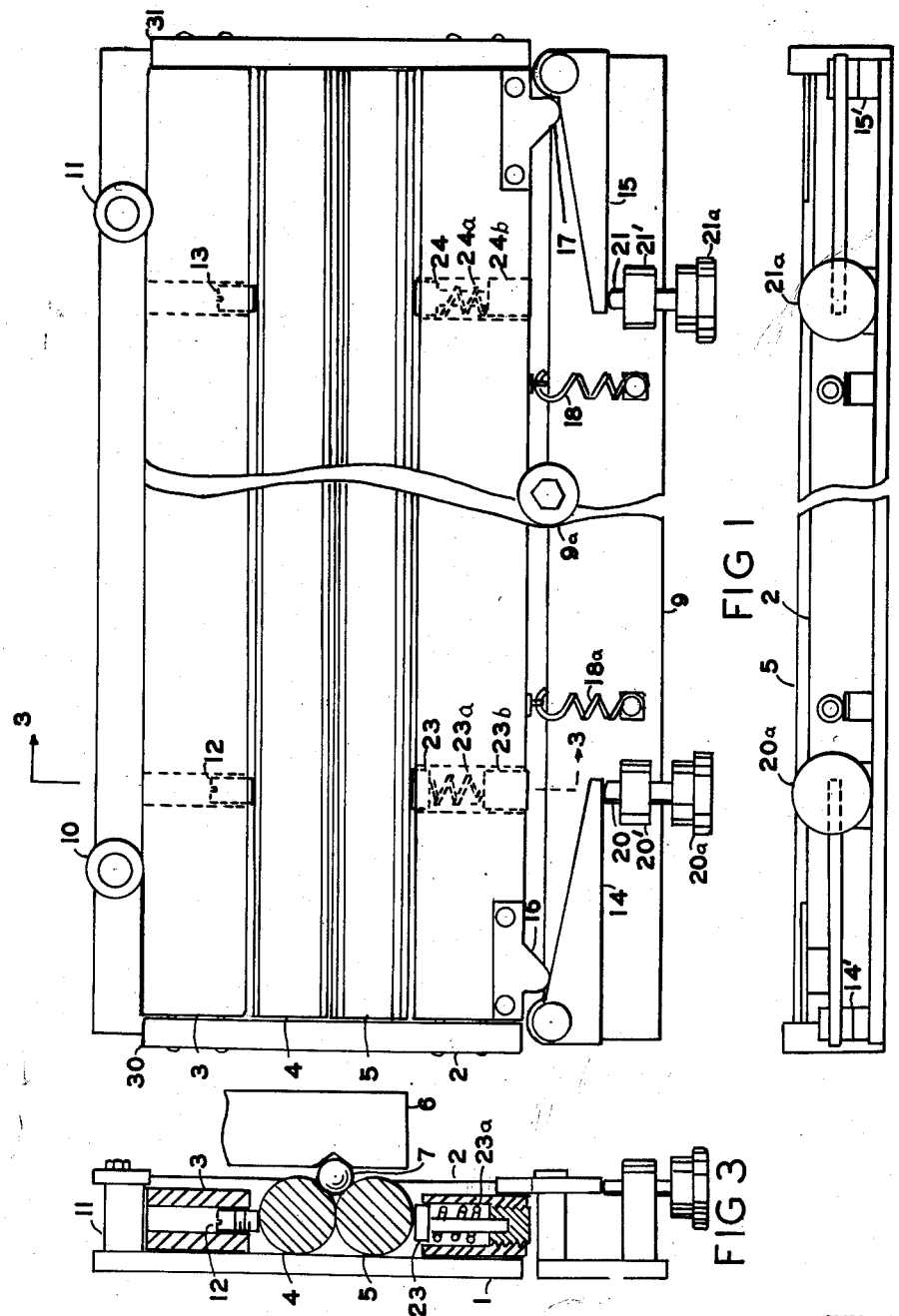

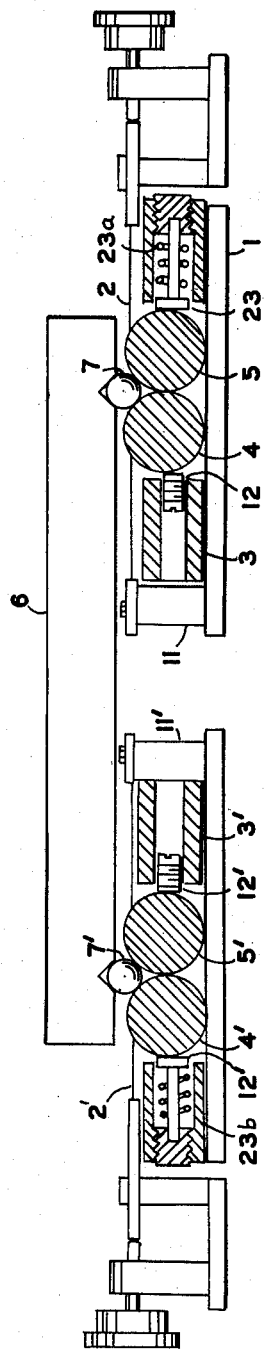

3,076,682
PRECISION WAYS
Andre R. Brault, Merrick, N.Y., assignor to
Optomechanisms, Inc., Mineola, N.Y.
Filed Sept. 7, 1961, Ser. No. 136,669
6 Claims. (Cl. 308—6)

This invention relates to precision ways for a moving carriage and more particularly to means for adjustably mounting ways in order to obtain and maintain very precise straightness of travel, such as is required in certain applications involving the movement of flat mirrors over long distances.

In precision instruments such as optical apparatus or machine tools involving a moving carriage, it is very difficult to make the rails or ways straight enough for optical accuracy and to maintain them in that condition.

The present invention solves those difficulties by constructing each way of two hardened steel rods mounted parallel and tangential to each other. Each way consisting of the two rods is mounted in a frame and the rods are spring loaded together with a plurality of adjustable spring loaded holders spaced along the rods. The adjustable holders flex and deform the rods to achieve precision straightness. The frame is adjustably mounted on a base and thumb screw lever adjustments are provided at each end to adjust the straightness of the frame. The carriage is mounted on large bearing balls, the ball diameter being about 40% of the diameters of the two rods, so that the ball rides the top of the rods along the axis of tangency of the rods.

Accordingly a principal object of the invention is to provide new and improved precision ways.

Another object of the invention is to provide new and improved means for mounting ways of precision straightness.

Another object of the invention is to provide new and improved means for mounting ways of precision straightness including means to adjust the position of the ways at intervals along the ways.

Another object of the invention is to provide new and improved means for mounting a moving carriage comprising a pair of ways each consisting of a stationary base, a frame mounted on said base, a pair of steel rods in said frame, said rods being parallel to and tangent to each other, means to spring load said rods together, and screw adjustment means connected to said frame adapted to straighten said rods.

Another object of the invention is to provide means for mounting a moving carriage on ways with a minimum of friction and loading.

These and other objects of the invention will be apparent in the following specification and drawings of which:

FIG. 1 is a top plane view of an embodiment of the invention.

FIG. 2 is a front view of FIG. 1 and,

FIG. 3 is a side view of FIG. 1, partly in section.

FIG. 4, is an end view of the embodiment of FIG. 1, showing a pair of ways.

Referring to the figures, the invention generally comprises the base 1, a pair of frame members 2 and 3, a pair of stainless steel rods 4 and 5 mounted between the frame members, the rods 4 and 5 being parallel and tangent to each other. The carriage 6 is mounted on a series of large balls 7 which are adapted to ride in the valley between the two rods 4 and 5 above their point of tangency. The rods are spring loaded together as will be described, and adjustment means are provided for adjusting the orientation of the frames.

More specifically, the frame members 2 and 3 are fixedly connected by end members 30 and 31 and held on the base 1 by the holddown studs 10 and 11. The frame member 3 has a plurality of adjustment screws 12 and 13 equally spaced along its length which are provided to adjust the straightness of the rods 4 and 5.

The frame assembly is positioned on the base 1 by means of the adjustment levers 14 and 15, on long member 9 which is clamped to the mounting base by clamp 9a. The frame member 2 has a pair of bearing cams 16 and 17 on each end which are adapted to bear against the levers 14 and 15 respectively. The frame assembly is held against the levers by means of the tension springs 18, 18a which connect the frame member 2 to the member 9 and causes the frame member 2 to bear against the adjustment levers 14 and 15.

The adjustment levers are pivotally mounted on the member 9 by means of the studs 14', 15', and the position of the levers is adjusted by means of the thumb screws 20, 21, which are mounted in tapped mounting ears 20' and 21', which are fixedly mounted on the member 9. The adjustment screw 20 has a knob 20a and the adjustment screw 21 has a knob 21a.

Frame member 2 has a plurality of equally spaced spring loaded members 23, 24, and so forth, which are mounted in shaftways in the frame member 2 and bear against the rods 4 and 5. The pusher members 23, 24, and so forth are spring loaded by means of the springs 23a, 24a, and so forth. The tension of the springs is adapted to be adjusted by means of the adjustment screws 23b, 24b, and so forth.

In order to adjust the straightness of the ways a carriage 6 containing a mirror or prism is mounted on a pair of ways and the angle of light rays reflected by the mirror is measured by conventional optical measuring apparatus. The measurements are made at intervals along the ways and as each measurement is made the adjustment screws 23b, 24b are adjusted to make the rods absolutely straight.

FIG. 4, shows an end view of the embodiment of FIG. 1, showing a pair of ways. This figure is the same as FIG. 3 except for the extra assembly on the left hand side, which has prime numbers corresponding to the numbers of the FIG. 3.

The orientation of the frames may be corrected during the adjustment with optical precision by adjusting the thumb screws 20 and 21. Raised end pieces 30 and 31 are preferably mounted at the ends of the frames to prevent the carriage from rolling off the ends of the ways.

The bars 4 and 5 are made of ball bearing steel and are ground, lapped, copper plated, chrome plated, ground, lapped, and honed to achieve the maximum straightness by known techniques. However, no mechanical bar or plate can be made optically straight by known techniques. Therefore, in the present invention the bars are actually deformed slightly to achieve the desired optical straightness. Very little pressure is required to do this, bearing in mind that the deforming that we are discussing is measured in millionths of an inch.

The present system provides precision ways which are adapted to be made optically straight by means of spring loaded adjustments on the bars 4 and 5. The large ball bearing provides a minimum of friction and loading. The rods, frames, and ball preferably made of hard steel, such as ball bearing steel and made with the highest accuracy.

I claim:

1. Means for mounting a moving carriage comprising a way consisting of a stationary base, a frame adjustably mounted on said base, means to adjust the postiion of said frame on said base, a pair of steel rods mounted in said frame, said rods being parallel and tangent to each other, and means to straighten said rods comprising spring loaded screw means bearing directly on said rods to deform said rods from said frame.

2. Apparatus as in claim 1 wherein said adjustment means comprises a thumb screw operated lever connected to said base and adapted to bear against the frame.

3. Precision means for mounting a moving carriage comprising a pair of parallel ways, each way being mounted on a stationary base, each way consisting of a frame adjustably mounted on said base, a pair of steel rods in said frame, said rods being parallel and tangent to each other, means to spring load said rods together and means to adjust the position of said frame on said base, a ball bearing mounted on each way consisting of a large ball having diameter substantially smaller than the diameter of said rods, a carriage mounted on said bearings, and means to adjust said rods relative said frame.

4. Means for mounting a moving carriage comprising a way consisting of a stationary base, a frame adjustably mounted on said base, means to adjust the position of said frame on said base, a pair of steel rods mounted in said frame, said rods being parallel and tangent to each other, and means spaced along said frames to adjustably space said rods from said frame.

5. Apparatus as in claim 4 wherein said adjustment means comprises a thumb screw operated lever connected to said base and adapted to bear against the frame.

6. Precision means for mounting a moving carriage comprising a pair of parallel ways, each way being mounted on a stationary base, each way consisting of a pair of frame members adjustably mounted on said base, a pair of steel rods in said frame, said rods being parallel and tangent to each other, means to straighten said rods including adjustable means spaced along said frame members to spring load said rods away from said frame and means to adjust the position of said frame on said base, a pair of ball bearings each mounted on one way consisting of a large ball having diameter substantially smaller than the diameter of said rods and a carriage mounted on said bearings.

References Cited in the file of this patent

UNITED STATES PATENTS

| | | |
|---|---|---|
| 1,386,745 | Von Post | Aug. 9, 1921 |
| 2,264,302 | Devlin | Dec. 2, 1941 |
| 2,672,378 | McVey | Mar. 16, 1954 |

FOREIGN PATENTS

| | | |
|---|---|---|
| 703,762 | Great Britain | Feb. 10, 1954 |